July 17, 1934.  B. E. O'HAGAN  1,966,558
REGULATING DEVICE USING COPPER OXIDE RECTIFIERS
Original Filed Oct. 14, 1930
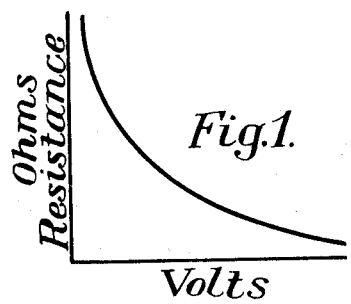
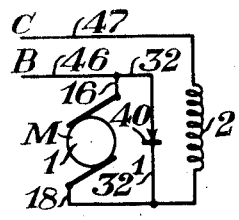
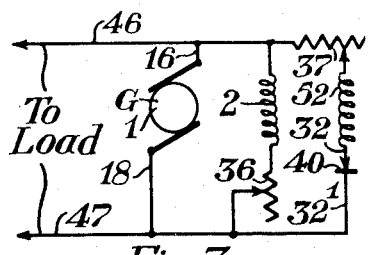
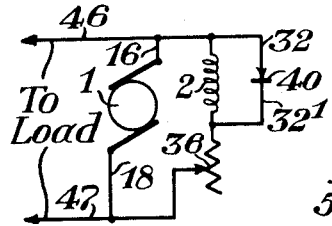
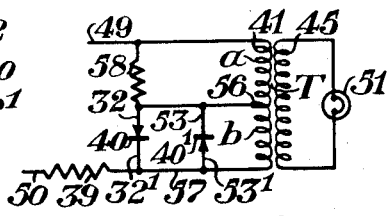
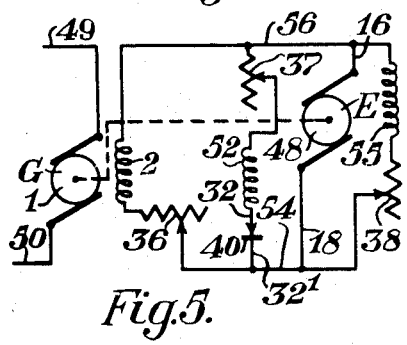
INVENTOR.
B. E. O'Hagan
by A. L. Vincill
His ATTORNEY.

Patented July 17, 1934

1,966,558

UNITED STATES PATENT OFFICE 1,966,558

REGULATING DEVICE USING COPPER OXIDE RECTIFIERS

Bernard E. O'Hagan, Swissvale, Pa., assignor to The Union Switch & Signal Company, Swissvale, Pa., a corporation of Pennsylvania Application October 14, 1930, Serial No. 488,574
Renewed July 11, 1933

1 Claim. (Cl. 171—119)

My invention relates to regulating devices using copper oxide rectifiers.

I will describe six forms of apparatus embodying my invention, and will then point out the novel features thereof in claim.

In the accompany drawing, Fig. 1 is a curve showing certain electrical characteristics of a copper oxide rectifier. Fig. 2 is a diagrammatic view showing one form of apparatus embodying my invention. Figs. 3, 4, 5, and 6 are views showing modified forms of apparatus also embodying my invention.

Similar reference characters refer to similar parts in each of the views.

Referring first to Fig. 1, the curve shown in this view illustrates the voltage-resistance characteristic of the copper oxide rectifier described and claimed in United States Letters Patent No. 1,640,335, granted to L. O. Grondahl on August 23, 1927. This curve shows that as the voltage across the rectifier increases, the resistance in the low resistance direction decreases, and that the decrease of resistance is much more rapid at low voltages than at high voltages.

Referring now to Fig. 2, the reference character M designates a direct current series wound motor, comprising an armature 1 and a field 2, which motor is connected with a source of current, the terminals of which are designated B and C. A copper oxide rectifier 40 is connected in multiple with the armature 1 and is poled to conduct current in the direction in which current is supplied to the field 2. A direct current series wound motor is characterized by the fact that the voltage drop across the armature is roughly proportional to the speed of the motor. When the circuit for motor M is first closed, the voltage across the armature 1 will be low, because this voltage is determined only by the resistance of the armature, and at this time the voltage across the rectifier 40 will also be low, so that the resistance of the rectifier will be high, with the result that practically no current will flow through rectifier 40. As the speed of the motor increases, the counter-electromotive force created by the armature will increase, so that the voltage drop across the armature, and also across the rectifier, will increase. This means that the resistance of the rectifier will decrease so that as the motor speed increases, the combined effective resistance of the armature and rectifier will tend to remain constant. A point will finally be reached at which an increase in motor speed would result in such a decrease of rectifier resistance that the drop across rectifier and armature will not change, which means that the speed of the motor will not rise above this point. It follows that with the apparatus shown in Fig. 2, for a given voltage applied to the terminals B and C, the parts may be so proportioned that the speed of the motor will be limited to a desired value.

In Fig. 3, the reference character G represents a direct current shunt wound generator comprising an armature 1 and a field 2 controlled by a variable resistance 36. Connected across armature 1 is a rectifier 40 and a differential field 52. Rectifier 40 permits current to flow only in the direction indicated by the arrow. Rectifier 40 and differential field 52 are connected across armature 1 through wire 16, wire 46, variable resistance 37, differential field 52, wire 32, rectifier 40, wire $32^1$, wire 47, and wire 18. Generator G is loaded across the armature and the load circuit is from wire 16, through wire 46, load, wire 47, and wire 18.

When generator G is driven at a constant speed, the voltage at the terminals of the generator will remain constant, but if the speed of the generator is increased, due to an increase of speed of the driving unit, the terminal voltage will increase. The increase of terminal voltage of generator G will cause an increase of voltage across rectifier 40. This will cause the resistance of rectifier 40 to decrease, and an increased current will pass through the rectifier to increase the energization of field 52. This increased energization of field 52 produces an increased flux which opposes the flux produced by field 2, and therefore the field intensity around the armature is weakened but the terminal voltage will remain constant because the speed of generator G increased.

Fig. 4 shows a shunt wound direct current generator with only one field winding, and in this case rectifier 40 is connected in parallel with shunt field 2 through wires 32 and $32^1$. When the voltage of generator G increases, the resistance of the rectifier will decrease, and this decrease of the rectifier resistance causes it to take more current. The increased current taken by the rectifier produces additional voltage drop across a variable resistance 36, thus lowering the voltage across, and, consequently, the current through, field winding 2. This weakening of the field strength counteracts any tendency for the output voltage of the generator to increase due to any cause such as an increase in the speed of the driving unit.

Fig. 5 shows how rectifier 40 may be applied to keep the terminal voltage of an alternating current generator constant when the generator field is energized by current from an exciter driven by the alternating current generator shaft. Geneator G comprises an armature 1 and a field 2 which is controlled by variable resistance 36. Connected in parallel with the generator field 2 is a rectifier 40 and a differential field 52 which is controlled by variable resistance 37. The current generated by exciter E flows from wire 16, through wire 56, field 2, variable resistance 36, wire 54, and wire 18, and parallel with the field path through variable resistance 37, differential field 52, wire 32, rectifier 40, and wire 32¹. When the generator speed is increased, due to an increase of speed of the driving unit, the voltage across terminals 49 and 50 is increased and the speed of exciter E is increased, increasing the voltage across armature 48 and across rectifier 40. The resistance of rectifier 40 decreases causing an increase of current through differential field 52 which opposes field 2, and the field intensity of armature 1 is decreased. The voltage across terminals 49 and 50 therefore remains constant.

In Fig. 6, an arrangement is shown whereby it is possible to maintain a practically constant secondary voltage on a transformer when the primary voltage varies. Two rectifiers 40 and 40¹ are arranged with opposite polarity so that both halves of the alternating voltage wave will cause current to flow through the circuit. Current in one direction will flow from wire 49, through part $a$ of winding 41, part $b$ of winding 41, wire 57, resistance 39 and wire 50, and parallel with part $b$ of winding 41 through wire 32, rectifier 40 and wire 32¹. Current in the reverse direction will flow from wire 50, resistance 39, wire 57, part $b$ of winding 41, part $a$ of winding 41 and wire 49, and parallel with part $b$ of winding 41 through wire 53¹, rectifier 40¹, and wire 53. As indicated in the diagram, rectifiers 40 and 40¹ may be connected to a low voltage at tap 56 of the primary winding 41, or they may be connected in parallel with the entire primary winding through a series resistor 58. When the applied voltage increases, rectifiers 40 and 40¹ will take increased current due to their lowered resistance and by producing an additional voltage drop across resistor 39 will maintain an approximately constant voltage across primary winding 41 of transformer T. This arrangement could be applied to maintain a constant voltage across a lamp 51 connected across secondary winding 45 of the transformer T or the arrangement could be used in connection with alternating current operated radio sets to prevent over energizing the filaments of the vacuum tubes when the line voltage increased above normal.

The main feature of my invention is that since a copper oxide rectifier has the electrical characteristic of lowering its resistance when the voltage across it is increased, the rectifier may be used as a regulating device in the manner described.

Although I have herein shown and described only six forms of apparatus embodying my invention, it is understood that various changes and modifications may be made therein within the scope of the appended claim without departing from the spirit and scope of my invention.

Having thus described my invention, what I claim is:

In combination, a transformer comprising a primary winding and a secondary winding, two oppositely poled rectifiers each connected in parallel with part of said primary winding, and a resistance connected in series with said primary winding to control the voltage across said primary winding in accordance with the current taken by said rectifiers.

BERNARD E. O'HAGAN.